United States Patent Office 3,304,158
Patented Feb. 14, 1967

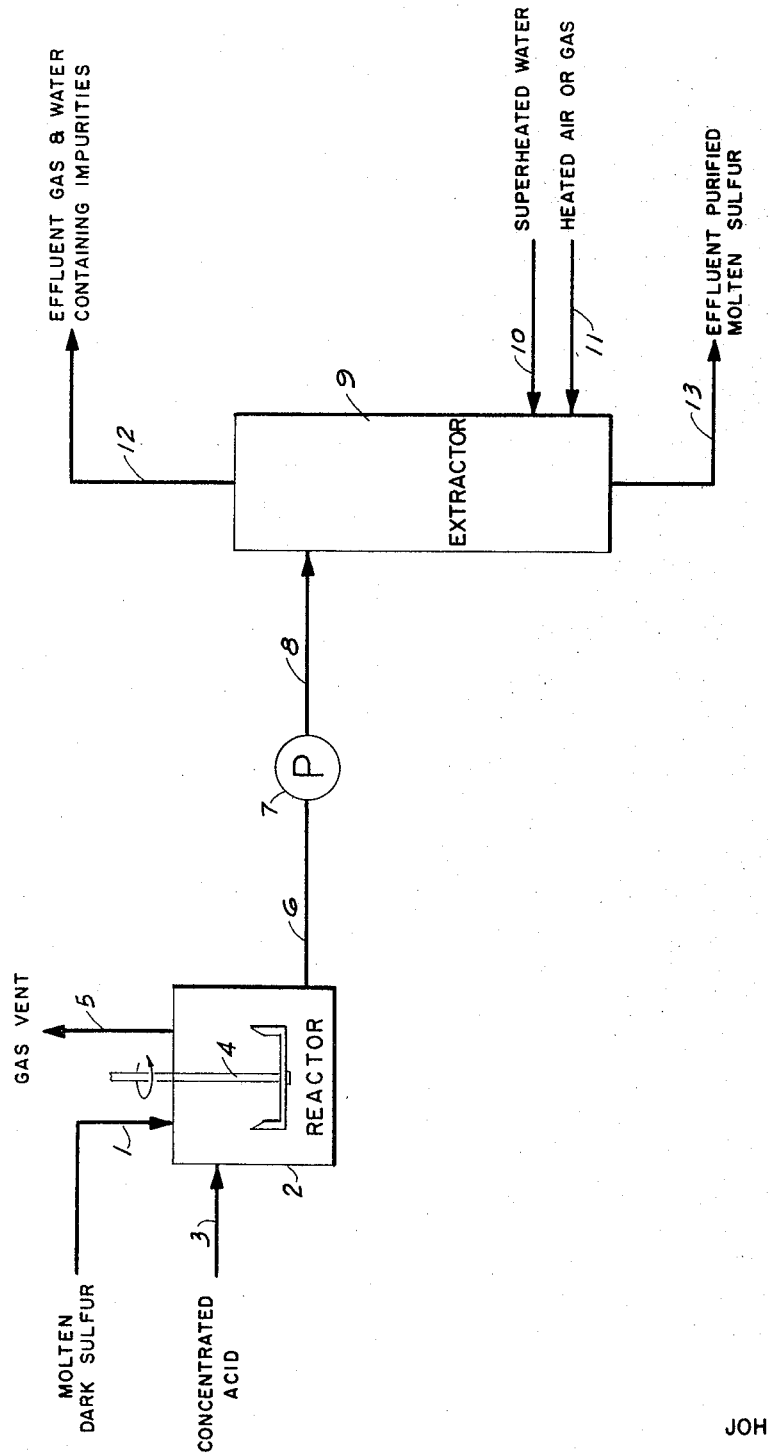

3,304,158
PURIFICATION OF DARK SULFUR
John M. Dale, San Antonio, Tex., assignor to Pan American Sulphur Company, Houston, Tex., a corporation of Delaware
Filed Aug. 18, 1964, Ser. No. 390,337
16 Claims. (Cl. 23—224)

This invention relates to a method of obtaining a very highly pure sulfur and more particularly to a method of removing the trace impurities normally found in dark sulfur.

The Frasch process is the most common process in use today for the mining of sulfur. The sulfur obtained by means of the Frasch process is a relatively pure material having a purity of at least 99% and sometimes as high as 99.95%. In many instances, the minor quantity of impurities contained in the sulfur can be ignored and the sulfur used in the as-mined condition. However, if the impurities even in these minute quantities are carbonaceous materials such as elemental carbon or various hydrocarbons and hydrocarbon derivates, the sulfur takes on a brown or black coloration and is generally referred to in the industry as "dark" sulfur. Because of this coloration, generally caused by the presence of from 0.05% to 1% by weight of carbonaceous impurities, this dark sulfur must be further purified before it can be considered commercially desirable. The same problem applies with respect to sulfurs mined from surface or near surface deposits.

The methods presently used, while often yielding a satisfactory purification, are very expensive to carry out and are generally wasteful of sulfur and other materials. Representative of the prior purification techniques are the distillation of molten sulfur, the adsorption of impurities on clay contacted with molten sulfur, the acid treating of solid dark sulfur followed by filtration through clay and the use of various solvents, generally cycloaliphatic hydrocarbon solvents, to extract impurities. Representative of the latter solvent extraction method is U.S. Patent No. 3,042,503.

The present method is extremely inexpensive and more economical to perform than the prior art methods. Furthermore, there is substantially no loss of sulfur by means of this invention.

In the process of this invention, molten sulfur is mixed with a small quantity of a treating agent which can be a sulfur trioxide material containing at least about 73% $SO_3$ by weight or concentrated nitric acid at a temperature and for a time sufficient to react with the impurities in the sulfur. Thereafter when the sulfur is maintained in the molten state the treating agent-contaminate-sulfur mixture is contacted with water, at a temperature above the melting point of sulfur, whereby substantially all of the carbonaceous impurities and the treating agent enter the water phase and substantially pure, normally colored, elemental sulfur is recovered.

The treating agent to be mixed with molten sulfur is preferably concentrated sulfuric acid, the hydrate of sulfur trioxide which preferably should have an $H_2SO_4$ content of at least about 95%. More highly concentrated sulfuric acid such as 100% sulfuric acid and the so-called fuming sulfuric acid, otherwise referred to as oleum can also be satisfactorily used. Sulfuric acid having an $H_2SO_4$ content below about 89% (about 73% by weight $SO_3$) by weight should generally not be employed because the process under those conditions is no longer as efficient. Where desired, sulfur trioxide (100% $SO_3$) can be employed directly. Concentrated nitric acid, i.e., nitric acid having an $HNO_3$ content in excess of about 65% can also be employed as a treating agent.

Only a small amount of treating agent such as sulfuric acid need be employed in the process of this invention. The optimum amount required for each given sample of dark sulfur will vary depending upon the actual chemical nature and concentration of impurities present in the sulfur. The optimum amount of treating agent to be reacted with any lot of dark sulfur will generally be within the range from about 1% to 5% of the weight of the sulfur. The use of too little treating agent should be avoided since purification may not be as complete. The use of more than the optimum quantity of treating agent, while not deleterious from a processing standpoint, is wasteful of the excess material.

The mixture of treating agent such as sulfuric acid and molten sulfur must be agitated for a period of time sufficient to insure adequate contact between the sulfuric acid and all of the impurities present in the molten dark sulfur. The impurities present generally, after agitation, separate from the sulfur and enter the acid phase, generally forming a liquid oil-like material. Care must be taken to insure that the agitation does not continue too long since if the reaction is permitted to continue for too great a time, the carbonaceous materials begin to form from the acid phase and have the character of discrete particles which tend to again contaminate the sulfur on further agitation, thereby rendering subsequent extraction considerably more difficult. The exact optimum time of agitation can easily be determined for each lot of sulfur and each treating agent type, concentration and addition ratio. Generally, the optimum time of agitation has been found to be within the range from about 5 to 20 minutes depending, of course, upon the degree of agitation, the amount of sulfuric acid, and the configuration of the reactor.

The melting point of sulfur, depending upon the particular physical or chemical form, generally is in the range from about 110° C. to 120° C. The process of this invention must take place above this melting point, preferably above 120° C. Generally, temperatures above about 150° C. are undesirable since such temperatures generally lead to foaming during the mixing of the sulfur and the acid. Optimum results are usually obtained at a temperature of from about 125° to 135° C. and an acid addition of about 1.5% by weight of the sulfur.

Once there has been a sufficient reaction between the treating agent and the dark sulfur, the acid phase and the impurities are extracted with water. Since the temperature during the extraction must be maintained above the melting point of sulfur and since the water must be maintained in the liquid phase, it is essential that the extraction be conducted under pressure. There are several ways in which the extraction can be carried out.

In one method, the mixture of treating agent and molten dark sulfur can be added to an extractor along with a quantity of water, the water being present in an amount of between about 30% and 100% by volume based on the volume of the molten sulfur. The water-molten sulfur mixture can then be subjected to violent agitation for a short period of time, preferably from about 5 to 30 minutes, to insure adequate contact between the water and the contaminates in the sulfur. Thereafter, agitation is stopped, and the materials are allowed to remain in a static position whereupon the molten sulfur, having the higher specific gravity, settles to the bottom of the extractor while the water remains at the top. In this method, substantially all of the carbonaceous impurities and the treating agent such as sulfuric acid will remain in the water phase. Once the phases have separated, any convenient means of recovering the sulfur can be employed, such as decantation or cooling of the sulfur to solidify it.

It is particularly convenient to add a gas in addition to the water to the extractor since the presence of a gas appears to aid in the removal of impurities. The use of air is preferred, although other gases not reactive with sulfur under these conditions, such as nitrogen, carbon dioxide, sulfur dioxide, and the like can be used. The gas, when employed, is generally used in an amount ranging from about 5% to 25% of the volume of water, taken under the reaction temperature and pressure. However, greater amounts of gas can be used when it can be tolerated in the particular equipment. The temperature of this separation step will generally be about the same as the temperature at which the sulfuric acid and sulfur are reacted, and in any event within the range from above the boiling point of sulfur to about 150° C. Although not generally necessary, several separation steps can be employed in sequence.

A somewhat more preferred method of performing the extraction involves the use of conventional liquid-liquid extraction equipment and the passage therethrough, in counter-current flow, of water and the sulfur-acid contaminate mixture. Again, it is convenient, although not absolutely essential, to employ a gas in the extractor, flowing in the same direction as the water, in order to create turbulence and promote better extraction. When using counter-current extraction equipment, the temperature of the extraction should be above the melting point of sulfur and generally not higher than about 150° C. Optimum results are in the range from about 125° C. to 135° C. The extraction is best done with the molten sulfur-acid mixture entering close to the top of an extraction column and flowing downwardly, and water and a gas, if used, such as air, entering at the bottom of the column and flowing upwardly, in countercurrent relation to the sulfur.

The optimum amount of water necessary for substantially complete extraction can be determined by a process of trial and error, but generally an amount of water equal to about 30% to 100% of the volume of molten sulfur treated can be employed. No harm results, of course, in the use of too much water but that, of course, renders the process more costly. Too little water can lead to incomplete extraction. The amount of gas, when employed, will generally be from about 5% to 25% of the volume of water, taken under extraction temperature and pressure.

The impurities and the acid mixed with the molten sulfur are removed by the water phase and substantially pure molten sulfur is recovered at the bottom of the extractor. The gas and the water containing the impurities, and the acid are removed at the top of the column and heat valves are generally not appreciably changed.

Any convenient type of extraction column may be employed. The column need not be packed. It is necessary that the extraction column, as well as all other equipment employed in this process, be adequately heated or insulated so as to maintain the temperature above the melting point of sulfur at all times and also be constructed of a material that is resistant to the corrosive environment.

It will be apparent that the process of this invention is easily adapted to the continuous purification of dark sulfur simply by coordinating the rate of reaction of the treating agent and the dark sulfur with the capacity of the extraction stage. In carrying out a continuous process, it is necessary to prevent the introduction into the extractor of any sludge formed during a temporary shutdown of the reactor and consequent over-reaction of acid and sulfur. The presence of such sludge in the reactor can lead to the formation of a sulfur-impurity emulsion at the water-sulfur interface in the extractor.

A schematic diagram of the process of this invention is illustrated in the drawing. As shown, molten dark sulfur containing from about 0.05% to 1% of carbonaceous impurities is pumped through line 1 into reactor 2. Concentrated sulfuric acid is also pumped into the reactor 2 through line 3 in the optimum quantity. Agitation of the reactants is maintained by agitator 4. Any gaseous reaction product produced, principally sulfur dioxide, is removed, through gas vent 5. At the conclusion of the necessary period of agitation, the mixture of molten sulfur and acid is removed from the reactor through line 6 and is passed into an extraction column 9 through pump 7 and inlet line 8. Superheated water is forced under pressure in line 10 into the extraction column 9 where it flows upwardly counter-current to the downward flow of the molten sulfur mixture. This brings the water into contact with the impurities, causing the impurities to leave the molten sulfur phase and enter the water phase. The water containing the extracted impurities is removed at the top of the extractor through line 12. Heated air or other gas can, if desired, be admitted through line 11 and caused to flow upwardly through the column. Sulfur, having been purified in its passage downwardly through the column, is in the substantially pure state as it leaves the reactor through line 13 at the bottom of the column. An interface between the superheated water and the molten sulfur is maintained near the top of the extractor and is controlled by controlling the effluent rate of purified sulfur through line 13. By holding the sulfur level constant in the extractor, any desired quantity of superheated water or air can be introduced for extraction purposes through lines 10 and 11 and discharged through line 12.

The following example represents, in the opinion of the inventer, the best mode of carrying out the invention.

A continuous process for the purification of dark sulfur was carried out. Dark brown-colored sulfur was obtained from a Mexican sulfur deposit by the Frasch process and was found to contain 0.085% carbon, 0.023% moisture and 0.003% acidity. The dark sulfur was melted in a suitable heat exchanger and was maintained at a temperature of about 130° C. About 1680 pounds of the molten sulfur per hour was charged to a reactor equipped with a high speed agitator and cascade chambers. High pressure steam circulated through the jacket of the reactor to maintain the temperature of the contents at 130° C. Concentrated sulfuric acid, containing 95% $H_2SO_4$ by weight, was added to the reactor at the rate of about 25.2 pounds per hour. Rapid agitation was maintained and reactor dwell time was set at 8 minutes. The effluent mixture was then pumped through steam jacketed lines to a vertical, unpacked extraction column having a height to diameter ratio of 18 to 1. The molten sulfur-acid mixture entered the column near the top and flowed downwardly while superheated water at a temperature of 135° C. and heated air at a temperature of 135° C. were flowed upwardly from an inlet port located near the bottom of the column. The molten sulphur was flowed downwardly at the rate of 1680 pounds per hour while superheated water was flowed upwardly at the rate of 420 pounds per hour. Purified molten sulfur was removed from the bottom of the extraction column and effluent water from the top. The molten sulfur removed was found to contain 0.012% carbon, 0.026% moisture and 0.003% acidity and was bright yellow in color.

Satisfactory results were also obtained using 70.4% by weight nitric acid as the treating agent in place of the 95% sulfuric acid.

Having thus described the invention, that which is desired to be claimed and protected by Letters Patent is as follows:

1. A method of purifying dark sulfur comprising mixing and reacting molten dark sulfur with about 1% by weight of a treating agent selected from the group consisting of concentrated nitric acid and sulfur trioxide containing materials containing at least about 73% by weight $SO_3$, and extracting impurities from the molten sulfur with water, at a temperature and pressure sufficient to maintain the sulfur and the water in the liquid phase.

2. A method as in claim 1 wherein the treating agent is concentrated nitric acid.

3. A method as in claim 1 wherein the treating agent is sulfur trioxide.

4. A method as in claim 1 wherein the treating agent is concentrated sulfuric acid containing at least about 89% by weight of $H_2SO_4$.

5. A method as in claim 4 wherein the impurities are extracted by passing the water and the molten sulfur-heating agent mixture in countercurrent flow, the volume of water employed being at least about 30% of the volume of sulfur.

6. A method as in claim 5 wherein the extraction is carried out in the additional presence of a gas flowing in the same direction as the water.

7. A method as in claim 6 wherein the gas is air.

8. A method as in claim 5 wherein the method is carried out at a temperature below about 150° C.

9. A method as in claim 4 wherein the extraction is carried out by mixing the acid-dark sulfur mixture with water, agitating to insure adequate contact and thereafter permitting purified molten sulfur to settle out.

10. A method of removing impurities from dark sulfur, thereby lightening the color, which comprises mixing and reacting molten dark sulfur having from about 0.05% to 1% by weight of carbonaceous impurities with from about 1% to 5% by weight of concentrated sulfuric acid having a concentration of at least about 95% by weight of $H_2SO_4$ at a temperature sufficient to maintain the sulfur in the molten state and below about 150° C. and then flowing the mixture countercurrently in contact with a flowing stream of water maintained at a temperature above the melting point of sulfur and below about 150° C., the volume of water employed being at least about 30% of the volume of molten sulfur, whereby impurities of the sulfur are extracted by the water.

11. A method as in claim 10 wherein a gas stream, in addition to the water stream, is flowed in countercurrent contact with the molten sulfur.

12. A method as in claim 10 wherein the temperature of reaction between the acid and the dark sulfur is adjusted to achieve the optimum temperature for removal of impurities from the particular lot of dark sulfur.

13. A method as in claim 10 wherein the temperature is within the range of about 125° C. to 135° C.

14. A method as in claim 13 wherein a gas stream, in addition to the water stream, is flowed in countercurrent contact with the molten sulfur.

15. A method as in claim 12 wherein the acid-treated molten sulfur is passed to an extractor where it is countercurrently extracted with water and substantially pure sulfur is obtained.

16. A method of treating dark sulfur to remove impurities comprising mixing and reacting molten dark sulfur with concentrated sulfuric acid in an amount within the range from about 1% to 5% by weight of the dark sulfur, for a time sufficient to dislodge impurities from the sulfur but insufficient to cause the appreciable formation of discrete carbonaceous particles washing the reaction mixture with water to extract impurities and thereafter recovering purified sulfur.

References Cited by the Examiner
UNITED STATES PATENTS

| | | | |
|---|---|---|---|
| 2,689,783 | 9/1954 | Marullo et al. | 23—224 |
| 3,042,503 | 7/1962 | Tuller et al. | 23—310 |
| 3,071,445 | 1/1963 | Gormley | 23—224 |

OSCAR R. VERTIZ, *Primary Examiner.*

MILTON WEISSMAN, A. J. GREIF,
*Assistant Examiners.*